United States Patent
Liaw et al.

(10) Patent No.: US 6,885,698 B1
(45) Date of Patent: Apr. 26, 2005

(54) EFFICIENT HARDWARE IMPLEMENTATION FOR SIGNAL RECONSTRUCTION OVER MULTIPLE ANALOG-TO-DIGITAL, DIGITAL-TO-ANALOG CONVERSIONS IN A TELECOMMUNICATION SYSTEM

(75) Inventors: Jin-Nan Liaw, San Jose, CA (US); Haibin Liu, San Lorenzo, CA (US); James Hon, Pleasanton, CA (US); Andrew L. Norrell, Nevada City, CA (US)

(73) Assignee: GoDigital Networks Corporation, Fremont, CA (US)

( * ) Notice: Subject to any disclaimer, the term of this patent is extended or adjusted under 35 U.S.C. 154(b) by 790 days.

(21) Appl. No.: 09/811,356

(22) Filed: Mar. 16, 2001

Related U.S. Application Data

(60) Provisional application No. 60/190,269, filed on Mar. 17, 2000.

(51) Int. Cl.[7] .............................. H04B 1/38; H04L 5/16
(52) U.S. Cl. ...................... 375/222; 375/220; 375/242
(58) Field of Search ................................ 375/220, 222, 375/345, 295; 714/220, 701

(56) References Cited

U.S. PATENT DOCUMENTS

| | | | | |
|---|---|---|---|---|
| 6,052,412 A |   | 4/2000  | Ruether et al. | 375/231 |
| 6,067,316 A | * | 5/2000  | Amrany et al.  | 375/220 |
| 6,151,364 A |   | 11/2000 | Ruether et al. | 375/254 |
| 6,404,829 B1| * | 6/2002  | Sonu           | 375/345 |

* cited by examiner

Primary Examiner—Stephen Chin
Assistant Examiner—Curtis Odom
(74) Attorney, Agent, or Firm—Sierra Patent Group, Ltd.

(57) ABSTRACT

Method and apparatus for providing an improved quality voice band channel equalization in telecommunication systems employing v.90 transmission standard in which PCM modem signals passing through a digital-to-analog and analog-to-digital conversion processes between a central office switch and a multiple subscriber access system may be reconstructed with improved quality at the A/D converter side by variably adjusting the gain between the digital-to-analog conversion process at the central office switch and the analog-to-digital conversion process at the multiple subscriber access system, and low pass filtering the signal using a second order low pass notch filter to provide a boost of 6 dB at a frequency of 4 KHz.

6 Claims, 6 Drawing Sheets

EFFICIENT HARDWARE IMPLEMENTATION FOR SIGNAL RECONSTRUCTION OVER MULTIPLE ANALOG-TO-DIGITAL, DIGITAL-TO-ANALOG CONVERSIONS IN A TELECOMMUNICATION SYSTEM

RELATED APPLICATION

This application claims priority under 35 USC § 119 to provisional application No. 60/190,269 entitled "Efficient Hardware Implementation for Signal Reconstruction Over Multiple Analog-to-Digital, Digital-to-Analog Conversion In a Telecommunication System" filed on Mar. 17, 2000.

BANKGROUND OF THE INVENTION

1. Field of the Invention

The present invention is related to data and/or voice data transmission in communication systems. In particular, the present invention is related to improved quality voice band channel equalization in telecommunication systems where Pulse Code Modulated (PCM) modem signals passing through a digital-to-analog (D/A) conversion process at a central office switch and an analog-to-digital (A/D) conversion process at a multiple subscriber access system may be reconstructed with improved quality.

2. Description of the Related Art

FIG. 1 illustrates a block diagram of a portion of a data path between data path point A at the central office switch and data path point B at the multiple subscriber carrier system 10. As shown, a 64 Kbps PCM signal is received by a $\mu$-law D/A converter 110 at the central office switch which converts the received PCM signal into a corresponding analog signal. The converted analog signal from the $\mu$-law D/A converter 110 is then provided to a fixed gain control unit 120 at the multiple subscriber carrier system 10, which is configured to compensate the converted analog signal for attenuation and transmission rate degradation due to noise. After adjusting for signal attenuation at the fixed gain control unit 120, the gain controlled signal is provided to a $\mu$-law A/D converter 130 for conversion back to the corresponding digital format.

Referring to FIG. 1, as can be seen, the signal path between the $\mu$-law D/A converter 110 and the gain control unit 120, which is usually the distance of a short cable connecting a central office switch to a central office unit in the data network, includes the introduction of system noise from various sources 140 in the data network environment of the data path. Accordingly, the gain control unit 120 may be configured to compensate for at least a portion of the system noise introduced from the various sources 140 which has an attenuating effect on the converted analog signal transmitted from the $\mu$-law D/A converter 110.

In a pair gain multiple subscriber carrier system, as discussed above, the signal path from the central office switch and the pair gain system may include some introduction of undesirable noise both internal and external to the pair gain system. The introduction of such noise has an attenuating effect on the signal and inevitably degrades the quality of the signal as various processes are performed thereon, and also, reduces the actual data transmission rate. Of importance, two such factors include the system noise and gain error. While introduction of system noise may not be a significant problem overall since the cable length between the central office and the pair gain system is generally less than five hundred feet, the data transmission rate is still affected by the introduction of the system noise. Moreover, in a V.90 standard type data connection, even a slight introduction of noise may render the connection ineffective.

FIG. 2 illustrates the relationship between the signal-to-noise (SNR) ratio and sample error rate of a multiple subscriber carrier system. As can be seen, the SNR has to be as high as 65 dB to avoid loss of data transmission rate. It can be seen from FIG. 2 that the sample (byte) error rate is used rather than bit error rate. For PCM modem connection over a Public Switched Telephone Network (PSTN), higher signal-to-noise ratio in the pair gain system usually supports higher signal connection speed. Thus, it is possible to approximately estimate the connection speed of a PCM modem by reviewing the sample error rate.

Moreover, as discussed above, a further component of signal transmission rate attenuation is gain errors. In particular, referring back to FIG. 1, the gain between the digital-to-analog conversion process at the $\mu$-law D/A converter 110, and the analog-to-digital conversion process at the $\mu$-law A/D converter 130 should be as close to 0 dB as possible to minimize the introduction of gain errors.

FIG. 3 illustrates the effect of gain error on the sample error rate in a multiple subscriber carrier system. As can be seen from FIG. 3, when the gain error is less than 0.13 dB, the signal transmission rate can be observed as largely unaffected. In view of the foregoing, it would be desirable to have a pair gain multiple subscriber system which minimizes or compensates for the introduction of noise in the signal path between digital-to-analog conversion process and the analog-to-digital conversion process in a data network such that the attenuation of signal transmission rate may be minimized.

SUMMARY OF THE INVENTION

In view of the foregoing, the present invention provides methods and apparatus for equalizing the voice band channel such that a PCM modem signal passing through a digital-to-analog—analog-to-digital conversion processes can be reconstructed with improved quality at the A/D converter.

In particular, in accordance with one embodiment of the present invention, there is provided a data communication system, comprising a gain control unit for receiving an analog signal converted from a digital signal and gain controlling the converted analog signal, a filter coupled to the gain control unit for filtering the gain controlled analog signal, and an analog to digital converter coupled to the filter for converting the filtered, gain controlled analog signal to a corresponding digital signal.

In one aspect, the digital signal and the corresponding digital signal output from the analog to digital converter may be substantially the same. Furthermore, the digital signal may be a 64 Kbps pulse code modulated (PCM) signal, and the analog to digital converter may include a $\mu$-law A/D converter. Additionally, the gain control unit may include an AC amplifier, and a variable gain unit coupled to the AC amplifier, configured to variably adjust a signal gain of the converted analog signal.

Furthermore, the filter may include a low pass filter, which may be a second order low pass notch filter. In particular, the low pass filter may include a pole at approximately 4,065 Hz, a zero at approximately 4,216 Hz, as well as a quality factor of 40.9. In one aspect, the low pass filter may be configured to increase the band edge gain at a frequency of approximately 4 KHz by approximately 6 dB.

Further, the digital signal received by the gain control unit may be provided from a central office switch.

In accordance with another embodiment of the present invention, there is provided an apparatus for providing compensation for signal attenuation in a data path including a digital-to-analog and analog-to-digital conversion processes, comprising a gain control unit for variably controlling the gain of a decoded signal decoded from a digital signal, and for generating a corresponding gain controlled signal, and a filter coupled to said gain control unit for providing equalization to the gain control signal and accordingly, generating an equalized gain control signal for encoding the equalized gain control signal to recover the digital signal.

In one aspect, the filter may be configured to increase the band edge gain at a frequency of approximately 4 KHz by approximately 6 dB. Furthermore, the filter may include a low pass filter having a pole at approximately 4,065 Hz and a zero at approximately 4,216 Hz. Additionally, the gain control unit may include a variable gain control unit having an AC amplifier and a gain unit, the variable gain control unit configured to adjust the gain of the decoded signal by a factor of approximately 1.

In accordance with yet another embodiment of the present invention, there is provided a multiple subscriber carrier system supporting v.90 standard data transmission, comprising a variable gain control unit coupled to a central office switch for receiving a converted analog signal converted from a digital signal and gain controlling the converted analog signal, a low pass filter coupled to the gain control unit for filtering the gain controlled analog signal, and a μ-law analog to digital converter coupled to the filter for converting the filtered, gain controlled analog signal to a corresponding digital signal, where the low pass filter is configured to increase the band edge gain of the gain controlled analog signal at a frequency of approximately 4 KHz by approximately 6 dB.

In one aspect of the present invention, the digital signal and the corresponding digital signal output from the μ-law analog to digital converter are substantially the same. Furthermore, the low pass filter includes a second order low pass notch filter which may have a pole at approximately 4,065 Hz, a zero at approximately 4,216 Hz, and a quality factor of 40.9.

In accordance with still another embodiment of the present invention, there is provided a data communication system, comprising means for receiving a converted analog signal converted from a digital signal, means for variably gain controlling the converted analog signal, means for filtering the gain controlled analog signal, and means for converting the filtered, gain controlled analog signal into a corresponding digital signal.

In accordance with yet still another embodiment of the present invention, there is provided a data communication method, comprising the steps of receiving an analog signal converted from a pulse code modulated (PCM) digital signal, variably gain controlling the converted analog signal, filtering the gain controlled analog signal, and converting the filtered, gain controlled analog signal into a corresponding digital signal.

In one aspect, the digital signal and the corresponding digital signal output from the analog to digital converter may be substantially the same. Moreover, the digital signal may include a 64 Kbps PCM signal. Additionally, the filtering step may include the step of providing a low pass filter, which has a pole at approximately 4,065 Hz, a zero at approximately 4,216 Hz, and a quality factor of 40.9. Further, the step of providing the low pass filter may include the step of increasing the band edge gain at a frequency of approximately 4 KHz by approximately 6 dB, while the receiving step may include the step of receiving an encoded signal a pulse code modulated signal from a central office switch.

In accordance with yet still a further embodiment of the present invention, there is provided a method of providing a multiple subscriber carrier system supporting v.90 standard data transmission, comprising the steps of receiving an analog signal converted from a 64 Kbps pulse code modulated (PCM) signal, gain controlling the analog signal, filtering the gain controlled analog signal, and converting the filtered, gain controlled analog signal to a corresponding digital signal, wherein the filtering step includes the step of increasing the band edge gain of the gain controlled analog signal at a frequency of approximately 4 KHz by approximately 6 dB. Moreover, in one aspect, the step of filtering may include the step of providing a low pass filter having a pole at approximately 4,065 Hz and a zero at approximately 4,216 Hz, and a quality factor of 40.9.

Indeed, in accordance with the present invention, the signal at the D/A converter at the remote side of the pair gain system (for example, at the central office side) has higher fidelity for the PCM modem to connect at higher speed. In particular, the present invention effectively equalizes the voice band channel and improves the reconstructed signal quality so that the pair gain system can provide a PCM modem with connection speed exceeding 33.6 Kbps limit, and in particular, with the system employing V.90 standard signal transmission.

Accordingly, one embodiment of the present invention provides a low pass filter circuit with desired filter characteristics that increases the band edge gain near 4 KHz by approximately 6 dB. Moreover, an all-pass filter in accordance with one embodiment of the present invention may be provided to compensate for the phase shift due to the low pass filter. Accordingly, the signal quality in a pair gain multiple subscriber carrier system with PCM modems having connection speeds exceeding 33.6 Kbps may be achieved.

These and other features and advantages of the present invention will be understood upon consideration of the following detailed description of the invention and the accompanying drawings.

DETAILED DESCRIPTION OF THE PREFERRED EMBODIMENT

Figure 4:
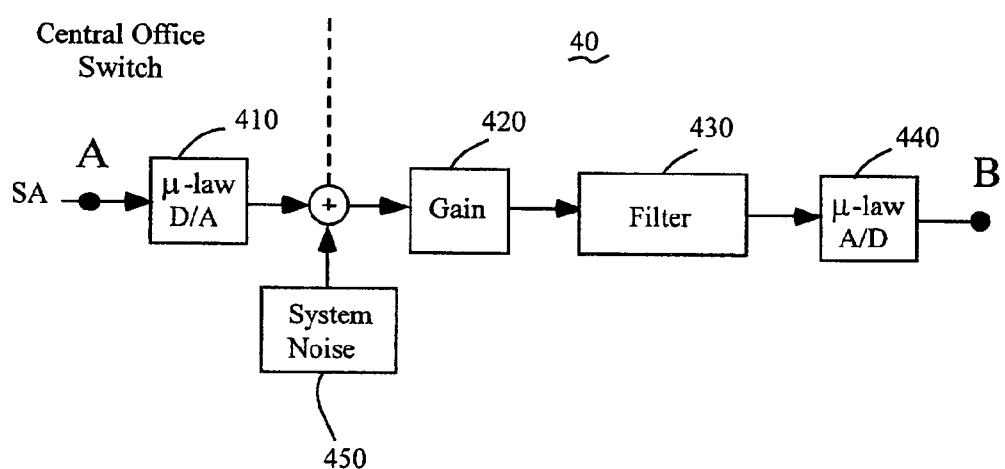
FIG. 4 illustrates a block diagram of a digital-to-analog conversion and an analog-to-digital conversion interface in accordance with one embodiment of the present invention.

FIG. 4 illustrates a functional block diagram of the D/A conversion and A/D conversion interface in a data path between data path point A at the central office switch and data path point B at a pair gain multiple subscriber carrier system 40 supporting V.90 standard signal transmission in accordance with one embodiment of the present invention. As shown, a µ-law D/A converter 410 at the central office switch receives 64 Kbps PCM signal converts the received PCM signal into a corresponding analog signal. At the multiple subscriber carrier system 40, there are provided a variable gain control unit 420 which is coupled to the a µ-law D/A converter 410 at the central office switch, and a low pass filter 430 coupled to the variable gain control unit 420. The converted analog signal from the µ-law D/A converter 410 is provided to a variable gain control unit 420 and a µ-law A/D converter 440 coupled to the low pass filter 440.

Figure 1:
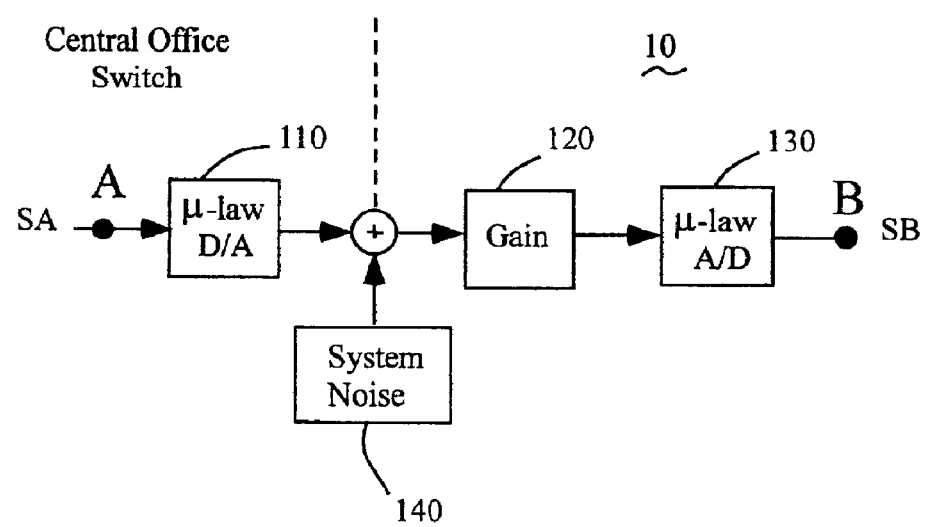
FIG. 1 illustrates a functional block diagram of the D/A conversion and A/D conversion interface in a multiple subscriber carrier system.
Figure 2:
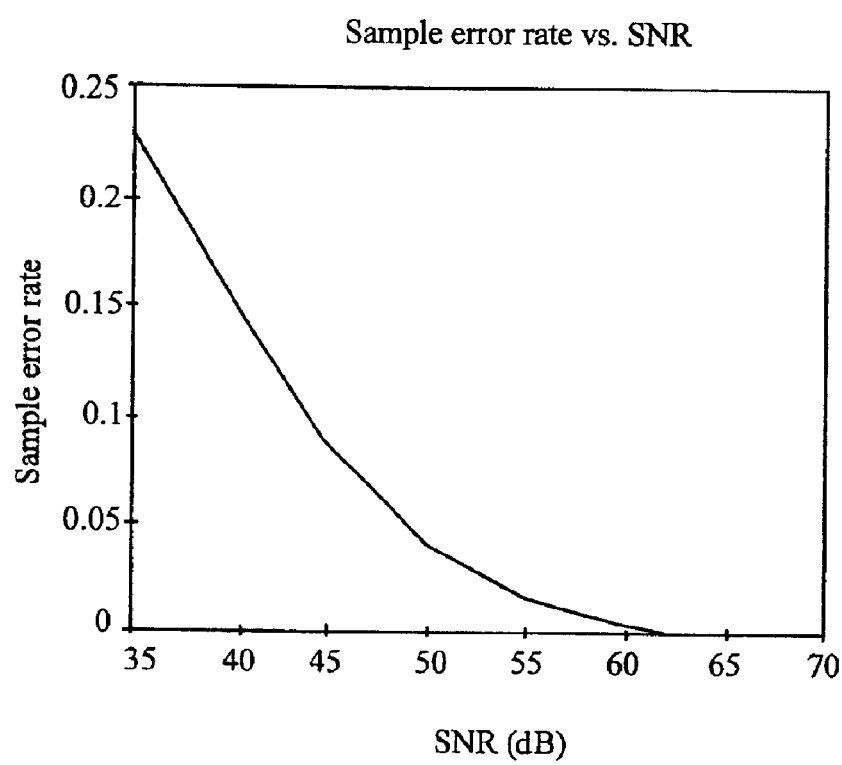
FIG. 2 illustrates the relationship between the signal-to-noise ratio and the sample error rate of the multiple subscriber carrier system of FIG. 1.
Figure 3:
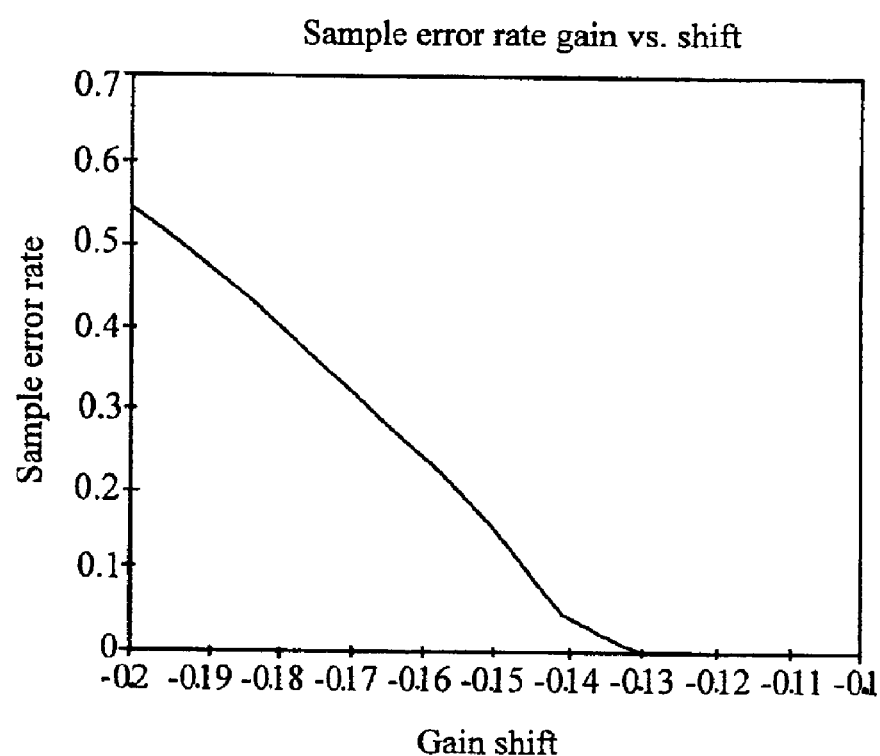
FIG. 3 illustrates the relationship between the gain error and the sample error rate of the multiple subscriber carrier system of FIG. 1.

In particular, the µ-law D/A converter 410 at the central office switch receives the 64 Kbps PCM signal and converts the received PCM signal to a corresponding analog signal. At the multiple subscriber carrier system 40, after passing through the variable gain control unit 420 and the low pass filter 430, the filtered, gain controlled analog signal is then provided to the µ-law A/D converter 440 which may be configured to convert the filtered, gain controlled analog signal into a corresponding digital data. In one embodiment, the µ-law A/D converter 440 may be configured to operate in a similar manner as the corresponding the µ-law A/D converter 130 shown in FIG. 1.

Referring back to FIG. 4, it can be seen that system noise may be introduced in the data path between data point A and data point B from various sources 450 including those external and internal to the multiple subscriber carrier system 40. As discussed above, such system noise introduced between data point A and data point B in the data network of the multiple carrier subscriber system 40 may significantly degrade the signal quality. Accordingly, in accordance with one embodiment of the present invention, the variable gain control unit 420 may be configured to variably adjust the gain of the converted analog signal received from the µ-law D/A converter 410 to compensate for attenuation of gain due to the introduction of the system noise in the data path between data point A at the central office switch and data point B at the multiple subscriber carrier system 40.

Moreover, in accordance with one embodiment of the present invention, the low pass filter 430 may be configured to receive the gain controlled, converted analog signal from the variable gain control unit 420 and low pass filter the received signal before the signal is provided to the µ-law A/D converter 440 for converting the gain controlled and filtered analog signal into a corresponding digital data. In one embodiment of the present invention, the low pass filter 430 may be configured to operate as an equalizer to increase the band edge gain near 4 KHz by approximately 6 dB.

Figure 5:
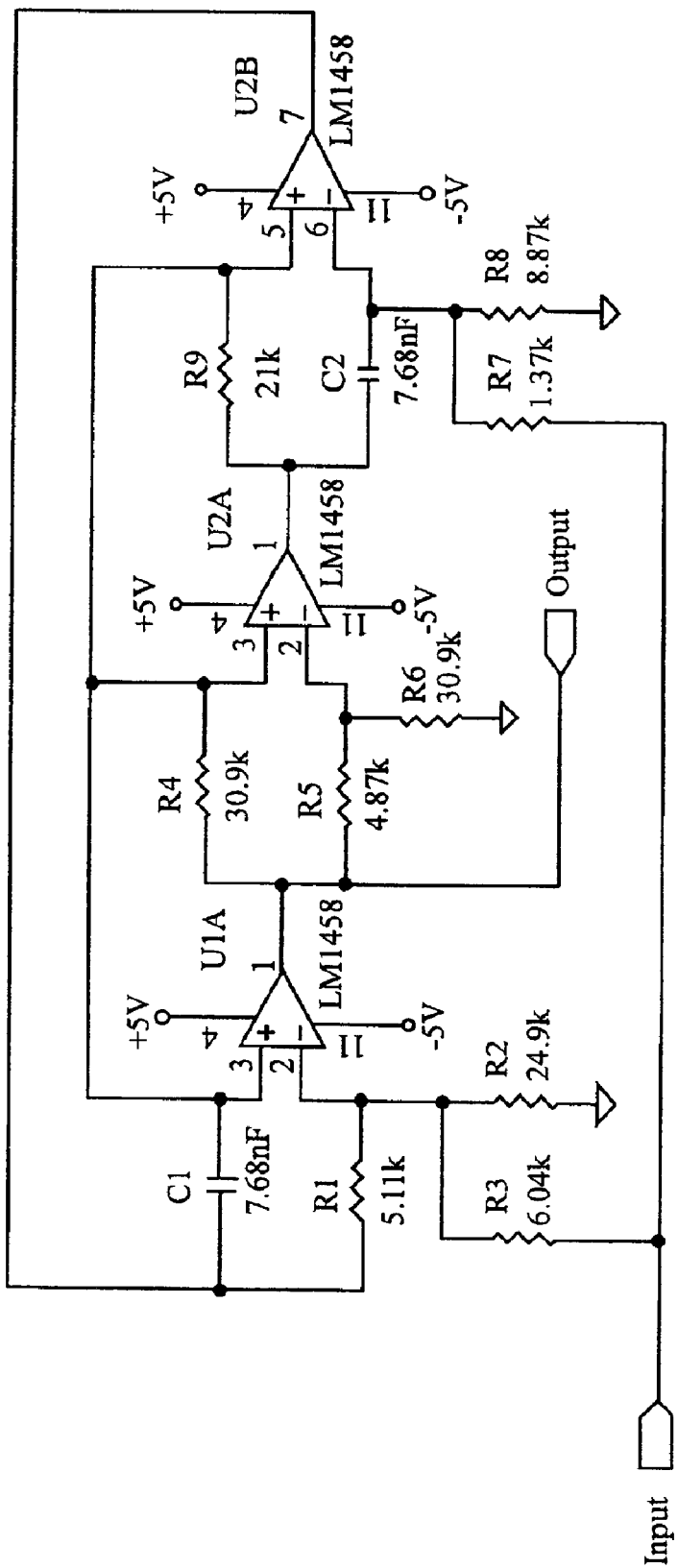
FIG. 5 illustrates a circuit schematic of the low pass filter shown in FIG. 4 in accordance with one embodiment of the present invention.

FIG. 5 illustrates a circuit schematic of the low pass filter 430 shown in FIG. 4 in accordance with one embodiment of the present invention. As shown, the low pass filter may be a Mikhael-Bhattachayya (MB) second order low pass notch filter in the configuration as provided in FIG. 5. In particular, the low pass filter 430 shown in FIG. 5 may be configured to provide a boost of 8 dB at a frequency of 4 KHz. The low pass filter 430 may have three parameters which determine its characteristics. These parameters include the quality factor (Qp), the pole (Fp) and the zero (Fz). In accordance with one embodiment of the present invention, the quality factor Qp of the low pass filter 430 may be 40.9 while the pole Fp and the zero Fz of the low pass filter 430 may be at 4,065 Hz and 4,216 Hz, respectively.

Figure 6:
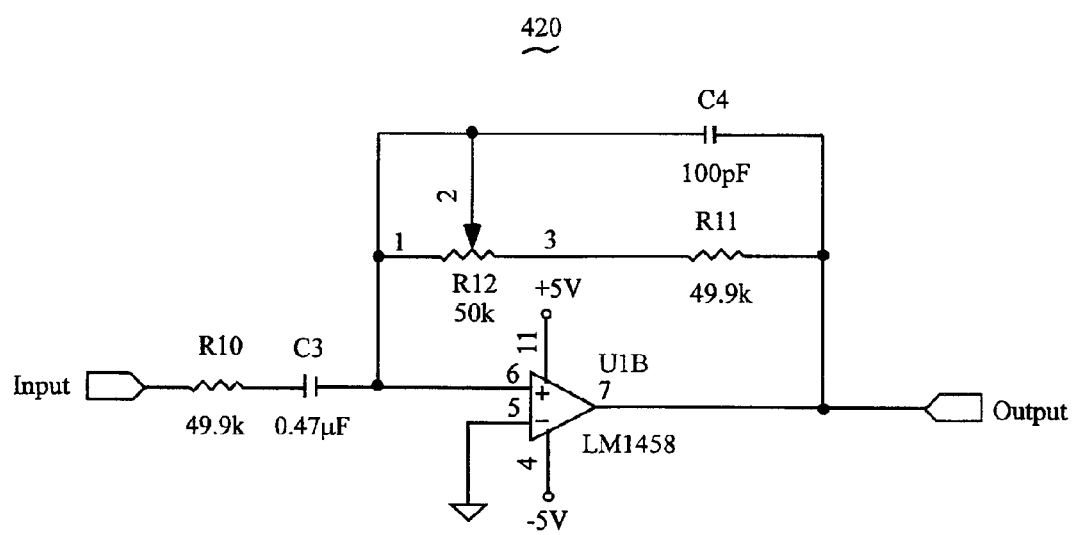
FIG. 6 illustrates a circuit schematic of the variable gain control unit shown in FIG. 4 in accordance with one embodiment of the present invention.

FIG. 6 illustrates a circuit schematic of the variable gain control unit 420 shown in FIG. 4 in accordance with one embodiment of the present invention. As shown, the variable gain control unit 420 may include an AC amplifier with a variable gain. In particular, referring back to FIG. 4, the variable gain control unit 420 in one embodiment of the present invention may be configured to adjust the gain between the digital-to-analog conversion process at the µ-law D/A converter 410 and the analog-to-digital conversion process at the µ-law A/D converter 440 in the data path between data point A and data point B to as close to one (0 dB) as possible.

In the manner described above, in accordance with one embodiment of the present invention, the variable gain control unit and the low pass filter provided in the data path between the µ-law D/A converter 410 at the central office switch and the µ-law A/D converter 440 at the multiple subscriber carrier system 40 may effectively compensate for the system noise introduced in the signal transfer path between the central office switch and the central office unit. In one aspect of the present invention, the gain between the digital-to-analog conversion process and the analog-to-digital conversion process may be established at approximately 0 dB with an error of less than 0.13 dB. In this manner, the received PCM signal may be sufficiently equalized such that the v.90 PCM connection may be maintained.

As discussed above, in accordance with the present invention, there is provided methods and apparatus for equalizing the voice band channel so that a PCM modem signal passing through a digital-to-analog, analog-to-digital conversion processes in the data path may be reconstructed with improved quality at the A/D converter side. In particular, one embodiment of the present invention provides a low pass filter circuit with desired filter characteristics that increases the band edge gain near 4 KHz by approximately 6 dB. Moreover, an all-pass filter in accordance with one embodiment of the present invention may be provided to compensate for the phase shift due to the low pass filter.

In the manner described above, the signal at the D/A converter at the remote side of the pair gain system may be provided with a higher fidelity, such that the PCM modem may be configured to connect at a higher data speed. Indeed, the present invention in one embodiment may be configured to effectively equalize the voice band channel and improve the re-constructed signal quality such that the pair gain system may provide a PCM modem with connection speed exceeding the 33.6 Kbps limit, in particular, with the system employing v.90 standard signal transmission.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A multiple subscriber carrier system supporting v.90 standard data transmission, comprising:

a variable gain control unit coupled to a central office switch for receiving a converted analog signal converted from a digital signal and gain controlling the converted analog signal;

a low pass filter coupled to the gain control unit for filtering the gain controlled analog signal; and a µ-law analog to digital converter coupled to the filter for converting the filtered, gain controlled analog signal to a corresponding digital signal;

wherein said low pass filter is configured to increase the band edge gain of said gain controlled analog signal at a frequency of approximately 4 KHZ by approximately 6 dB.

2. The system of claim 1 wherein said digital signal and said corresponding digital signal output from said µ-law analog to digital converter are substantially the same.

3. The system of claim 1 wherein said low pass filter includes a second order low pass notch filter.

4. The system of claim 1 wherein said low pass filter includes a pole at approximately 4,065 Hz and a zero at approximately 4,216 Hz, and a quality factor of 40.9.

5. A method of providing a multiple subscriber carrier system supporting v.90 standard data transmission, comprising the steps of:

receiving an analog signal converted from a 64 Kbps pulse code modulated (PCM) signal;

gain controlling the analog signal;

filtering the gain controlled analog signal; and converting the filtered, gain controlled analog signal to a corresponding digital signal;

wherein said filtering step includes the step of increasing the band edge gain of said gain controlled analog signal at a frequency of approximately 4 KHz by approximately 6 dB.

6. The method of claim 5 wherein said step of filtering includes the step of providing a low pass filter having a pole at approximately 4,065 Hz and a zero at approximately 4,216 Hz, and a quality factor of 40.9.

* * * * *